United States Patent
Nonaka et al.

(10) Patent No.: US 10,487,727 B2
(45) Date of Patent: Nov. 26, 2019

(54) METHOD OF CONTROLLING GAS ENGINE

(71) Applicant: KAWASAKI JUKOGYO KABUSHIKI KAISHA, Kobe-shi, Hyogo (JP)

(72) Inventors: Yosuke Nonaka, Himeji (JP); Tomoaki Kizuka, Takatsuki (JP); Satoru Fukao, Kobe (JP); Shigeharu Fujihara, Amagasaki (JP); Towa Hirayama, Kakogawa (JP); Hiroyoshi Ishii, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 79 days.

(21) Appl. No.: 15/772,114

(22) PCT Filed: Oct. 6, 2016

(86) PCT No.: PCT/JP2016/079826
§ 371 (c)(1),
(2) Date: Apr. 30, 2018

(87) PCT Pub. No.: WO2017/073285
PCT Pub. Date: May 4, 2017

(65) Prior Publication Data
US 2018/0313260 A1    Nov. 1, 2018

(30) Foreign Application Priority Data
Oct. 30, 2015    (JP) .................................. 2015-214007

(51) Int. Cl.
*F02P 5/00*    (2006.01)
*F02B 43/02*    (2006.01)
(Continued)

(52) U.S. Cl.
CPC .............. *F02B 43/02* (2013.01); *F02D 19/02* (2013.01); *F02D 35/027* (2013.01); *F02D 45/00* (2013.01);
(Continued)

(58) Field of Classification Search
CPC . F02D 37/02; F02P 5/00; F02P 5/1526; F02P 5/145; F02P 5/15
(Continued)

(56) References Cited

U.S. PATENT DOCUMENTS 5,529,040 A * 6/1996 Takeda .................... F02P 5/045
123/406.35
5,694,900 A * 12/1997 Morita .................... F02P 17/12
123/406.21
(Continued)

FOREIGN PATENT DOCUMENTS

JP    2010-084681 A    4/2010

*Primary Examiner* — John Kwon
(74) *Attorney, Agent, or Firm* — Oliff PLC

(57) ABSTRACT

A method of controlling a gas engine that is operated under lean-burn conditions, the method adjusting ignition timing such that a delay calculation value of an actual knocking occurrence ratio becomes a target occurrence ratio, the method comprising: when a delay calculation value of a maximum pressure in a cylinder of the gas engine is greater than or equal to a reference value, converting the delay calculation value into a virtual knocking occurrence ratio greater than or equal to a value greater than the target occurrence ratio; and either adding the virtual knocking occurrence ratio to the delay calculation value of the actual knocking occurrence ratio and then comparing the resulting delay calculation value of the actual knocking occurrence ratio with the target occurrence ratio, or comparing the virtual knocking occurrence ratio instead of the delay calculation value of the actual knocking occurrence ratio with the target occurrence ratio.

12 Claims, 6 Drawing Sheets

(51) Int. Cl.
    *F02D 45/00*     (2006.01)
    *F02D 19/02*     (2006.01)
    *F02D 35/02*     (2006.01)
    *F02M 21/02*     (2006.01)
    *F02P 5/15*     (2006.01)
    *F02D 41/00*     (2006.01)
    *F02D 41/40*     (2006.01)

(52) U.S. Cl.
    CPC ....... *F02M 21/0275* (2013.01); *F02P 5/1502* (2013.01); *F02D 41/008* (2013.01); *F02D 41/403* (2013.01)

(58) Field of Classification Search
    USPC ............ 123/406.11, 406.16, 406.17, 406.21, 123/406.22, 406.23, 406.29, 406.34, 123/406.41
    See application file for complete search history.

(56) References Cited

U.S. PATENT DOCUMENTS

| | | | |
|---|---|---|---|
| 2008/0087255 A1* | 4/2008 | Aoyama | F02D 13/023 123/48 B |
| 2008/0103682 A1* | 5/2008 | Sugimoto | B60K 6/445 701/111 |
| 2011/0259298 A1 | 10/2011 | Imamura et al. | |
| 2017/0030275 A1* | 2/2017 | Kuzuoka | F02D 19/081 |
| 2018/0372055 A1* | 12/2018 | Hirayama | F02P 5/152 |

* cited by examiner

METHOD OF CONTROLLING GAS ENGINE

TECHNICAL FIELD

The present invention relates to a method of controlling a gas engine.

BACKGROUND ART

Conventionally, there are known gas engines that are operated under lean-burn conditions that realize highly efficient and high-power operation with low $NO_X$ emission. In the operating region of a gas engine, there exist a knocking region and a misfire region based on the relationship between air-fuel ratio (excess air ratio) and brake mean effective pressure (BMEP). Therefore, it is desired to control a gas engine so that the gas engine can operate with high efficiency and high power while preventing knocking and misfire.

For example, Patent Literature 1 discloses a gas engine controlling method, in which the ignition timing is adjusted such that a delay calculation value of an actual knocking occurrence ratio becomes a target occurrence ratio. In the controlling method, it is determined, for each cycle, based on the pressure in the cylinder whether or not allowable knocking has occurred. The actual knocking occurrence ratio means the ratio of the number of cycles in which allowable knocking has occurred to a predetermined number of cycles. In this controlling method, if the delay calculation value of the actual knocking occurrence ratio (e.g., a moving average value) is lower than the target occurrence ratio, the ignition timing is advanced based on a deviation between the delay calculation value of the actual knocking occurrence ratio and the target occurrence ratio. If the delay calculation value of the actual knocking occurrence ratio is higher than the target occurrence ratio, the ignition timing is retarded based on a deviation between the delay calculation value of the actual knocking occurrence ratio and the target occurrence ratio.

CITATION LIST

Patent Literature

PTL 1: Japanese Laid-Open Patent Application Publication No. 2010-84681

SUMMARY OF INVENTION

Technical Problem

In a case where a fuel gas with a high methane number is used as a fuel gas for a gas engine, knocking hardly occurs. Accordingly, in this case, if the ignition timing is controlled based on the delay calculation value of the actual knocking occurrence ratio as described above, since the delay calculation value of the actual knocking occurrence ratio is substantially zero, the ignition timing will be too advanced.

In view of the above, an object of the present invention is to provide a method of controlling a gas engine, the method making it possible to operate the gas engine with suitable ignition timing even in a case where a fuel gas with a high methane number is used as a fuel gas for the gas engine.

Solution to Problem

The inventors of the present invention conducted diligent studies in order to solve the above-described problems. As a result of the studies, the inventors have come up with virtually converting the maximum pressure in the cylinder into a knocking occurrence ratio since the maximum pressure in the cylinder becomes excessively high when the ignition timing is too advanced. By using such a virtual knocking occurrence ratio, the above-described controlling method, in which the ignition timing is controlled based on the delay calculation value of the actual knocking occurrence ratio, can be used with almost no changes made to the method. The present invention has been made from these viewpoints.

Specifically, a method of controlling a gas engine according to the present invention is a method of controlling a gas engine that is operated under lean-burn conditions, the method adjusting ignition timing such that a delay calculation value of an actual knocking occurrence ratio becomes a target occurrence ratio. The method includes: when a delay calculation value of a maximum pressure in a cylinder of the gas engine is greater than or equal to a reference value, converting the delay calculation value of the maximum pressure in the cylinder into a virtual knocking occurrence ratio greater than or equal to a value that is greater than the target occurrence ratio; and either adding the virtual knocking occurrence ratio to the delay calculation value of the actual knocking occurrence ratio and then comparing the resulting delay calculation value of the actual knocking occurrence ratio with the target occurrence ratio, or comparing the virtual knocking occurrence ratio instead of the delay calculation value of the actual knocking occurrence ratio with the target occurrence ratio.

According to the above configuration, in a case where knocking hardly occurs in the cylinder and the ignition timing is too advanced, causing the maximum pressure in the cylinder to become excessively high, the maximum pressure in the cylinder is converted into the virtual knocking occurrence ratio greater than or equal to a value that is greater than the target occurrence ratio, and the ignition timing is retarded. Therefore, even in a case where a fuel gas with a high methane number is used as a fuel gas for the gas engine, the gas engine can be operated with suitable ignition timing.

The method may include: when the delay calculation value of the maximum pressure in the cylinder is between the reference value and a lower setting value less than the reference value, converting the delay calculation value of the maximum pressure in the cylinder into the virtual knocking occurrence ratio by proportional calculation between zero and the value greater than the target occurrence ratio; and either adding the virtual knocking occurrence ratio to the delay calculation value of the actual knocking occurrence ratio and then comparing the resulting delay calculation value of the actual knocking occurrence ratio with the target occurrence ratio, or comparing the virtual knocking occurrence ratio instead of the delay calculation value of the actual knocking occurrence ratio with the target occurrence ratio. According to this configuration, the virtual knocking occurrence ratio increases gradually from zero. Therefore, the stability can be improved compared to a case where the virtual knocking occurrence ratio increases rapidly from zero.

The method may include: both when the delay calculation value of the maximum pressure in the cylinder is greater than or equal to the reference value and when the delay calculation value of the maximum pressure in the cylinder is less than the reference value, adding the virtual knocking occurrence ratio to the delay calculation value of the actual knocking occurrence ratio and then comparing the resulting delay calculation value of the actual knocking occurrence ratio with the target occurrence ratio, and when the delay calculation value of the maximum pressure in the cylinder is less than or equal to the lower setting value, converting the delay calculation value of the maximum pressure in the cylinder into the virtual knocking occurrence ratio of zero. According to this configuration, the virtual knocking occurrence ratio can be always added to the actual knocking occurrence ratio. This makes it possible to simplify the control logic.

The method may include, when the delay calculation value of the maximum pressure in the cylinder is greater than or equal to an upper setting value that is greater than the reference value, converting the delay calculation value of the maximum pressure in the cylinder into the virtual knocking occurrence ratio of a value that is 1.5 times or more as great as the target occurrence ratio. According to this configuration, when the maximum pressure in the cylinder becomes close to the upper setting value (e.g., mechanical upper limit), the ignition timing is greatly retarded. Therefore, even if an unfavorable condition occurs, the condition can be improved immediately.

For example, the delay calculation value of the maximum pressure in the cylinder may be a moving average value of the maximum pressure.

Advantageous Effects of Invention

The present invention makes it possible to operate a gas engine with suitable ignition timing even in a case where a fuel gas with a high methane number is used as a fuel gas for the gas engine.

DESCRIPTION OF EMBODIMENTS

Figure 1:
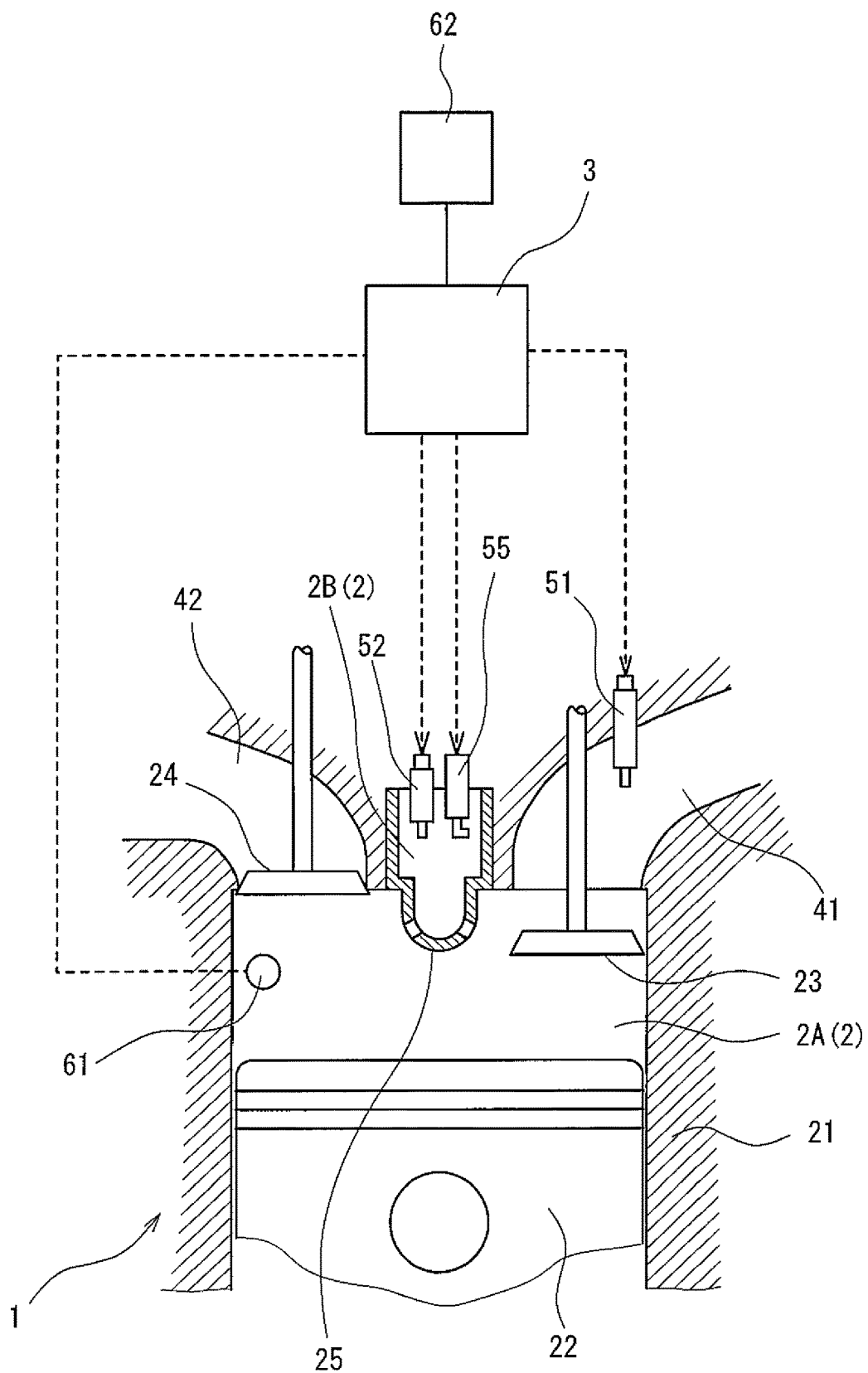
FIG. 1 is a sectional view of a part of a gas engine.

Hereinafter, a method of controlling a gas engine according to one embodiment of the present invention is described with reference to FIG. 1 to FIG. 5. FIG. 1 shows a gas engine 1 used in the present embodiment. The gas engine 1 is operated under lean-burn conditions.

The gas engine 1 may be a pure gas engine that combusts only a fuel gas (e.g., natural gas), or may be a dual fuel engine that combusts one of or both a fuel gas and a fuel oil. In the present embodiment, the gas engine 1 is a 4-stroke engine. However, as an alternative, the gas engine 1 may be a 2-stroke engine.

The gas engine 1 includes a plurality of cylinders 21 (FIG. 1 shows only one cylinder 21). Since all the cylinders 21 have the same configuration, only one cylinder 21 is described below.

In the cylinder 21, a piston 22 is disposed such that the piston 22 is movable in a reciprocating manner. The cylinder 21 and the piston 22 form a combustion chamber 2. The piston 22 is coupled to an unshown crank shaft by an unshown connecting rod.

In a case where the gas engine 1 is a 4-stroke engine, in the cylinder 21, the piston 22 reciprocates twice, and thereby one cycle of the gas engine 1 (intake, compression, expansion, and exhaust) is performed. The phase angle (0 to 720 degrees) of the gas engine 1 during one cycle of the cylinder 21 is detected by a phase angle detector 62. For example, the rotation angle of the crank shaft (i.e., crank angle) or the position of the piston 22 can be used as the phase angle. As one example, the phase angle detector 62 is an electromagnetic pickup, a proximity switch, or a rotary encoder. The actual rotational speed of the gas engine 1 is also detected from the phase angle detector 62.

Air is supplied to the combustion chamber 2 through an intake passage 41, and exhaust gas is discharged from the combustion chamber 2 through an exhaust passage 42. The intake passage 41 is provided with a main fuel injection valve 51, which injects a fuel gas into the air supplied to the combustion chamber 2.

The cylinder 21 is provided with: an intake valve 23, which opens and closes an intake port that is an opening of the intake passage 41, the opening facing the combustion chamber 2; and an exhaust valve 24, which opens and closes an exhaust port that is an opening of the exhaust passage 42, the opening facing the combustion chamber 2. The cylinder 21 is also provided with a spark plug 55 (one example of an ignitor) for igniting an air-fuel mixture of the fuel gas and the air in the combustion chamber 2.

In the present embodiment, the combustion chamber 2 includes: a main combustion chamber 2A, which communicates with the intake passage 41 and the exhaust passage 42; and an auxiliary combustion chamber 2B, which is divided from the main combustion chamber 2A by a dividing wall 25 with communication holes formed therein. The spark plug 55 is disposed in the auxiliary combustion chamber 2B. The fuel gas is injected into the auxiliary combustion chamber 2B by an auxiliary fuel injection valve 52. A rich air-fuel mixture is formed in the auxiliary combustion chamber 2B by the injection of the fuel gas from the auxiliary fuel injection valve 52, and the air-fuel mixture is ignited by the spark plug 55. As a result, a flame is generated in the auxiliary combustion chamber 2B, and the flame propagates into the main combustion chamber 2A through the communication holes formed in the dividing wall 25. Consequently, a lean air-fuel mixture in the main combustion chamber 2A is also ignited. The cylinder 21 is provided with a pressure meter 61, which detects a pressure P in the cylinder 21 (the pressure in the main combustion chamber 2A).

It should be noted that the ignitor is not limited to the spark plug 55, which ignites the air-fuel mixture in the auxiliary combustion chamber 2B. For example, a pilot fuel injection valve that directly injects a high-pressure pilot fuel (oil or fuel gas) into the main combustion chamber 2A to cause self-ignition of the pilot fuel can be adopted as the ignitor.

The fuel injection valves 51 and 52 and the spark plug 55 are controlled by a controller 3 based on, for example, the phase angle detected by the phase angle detector 62. The controller 3 adjusts the ignition timing for each cycle, such that a delay calculation value of an actual knocking occurrence ratio $Kr$ becomes a target occurrence ratio $Kt$ (e.g., 7.5%).

The actual knocking occurrence ratio Kr is the ratio of the number of cycles Ck in which allowable knocking has occurred to a predetermined number of cycles Cy (e.g., 50 cycles) (i.e., Kr=Ck/Cy). In the present embodiment, the delay calculation value of the actual knocking occurrence ratio Kr is a moving average value of the actual knocking occurrence ratio Kr. However, as an alternative, the delay calculation value may be a first-order lag calculation value.

Figure 2:
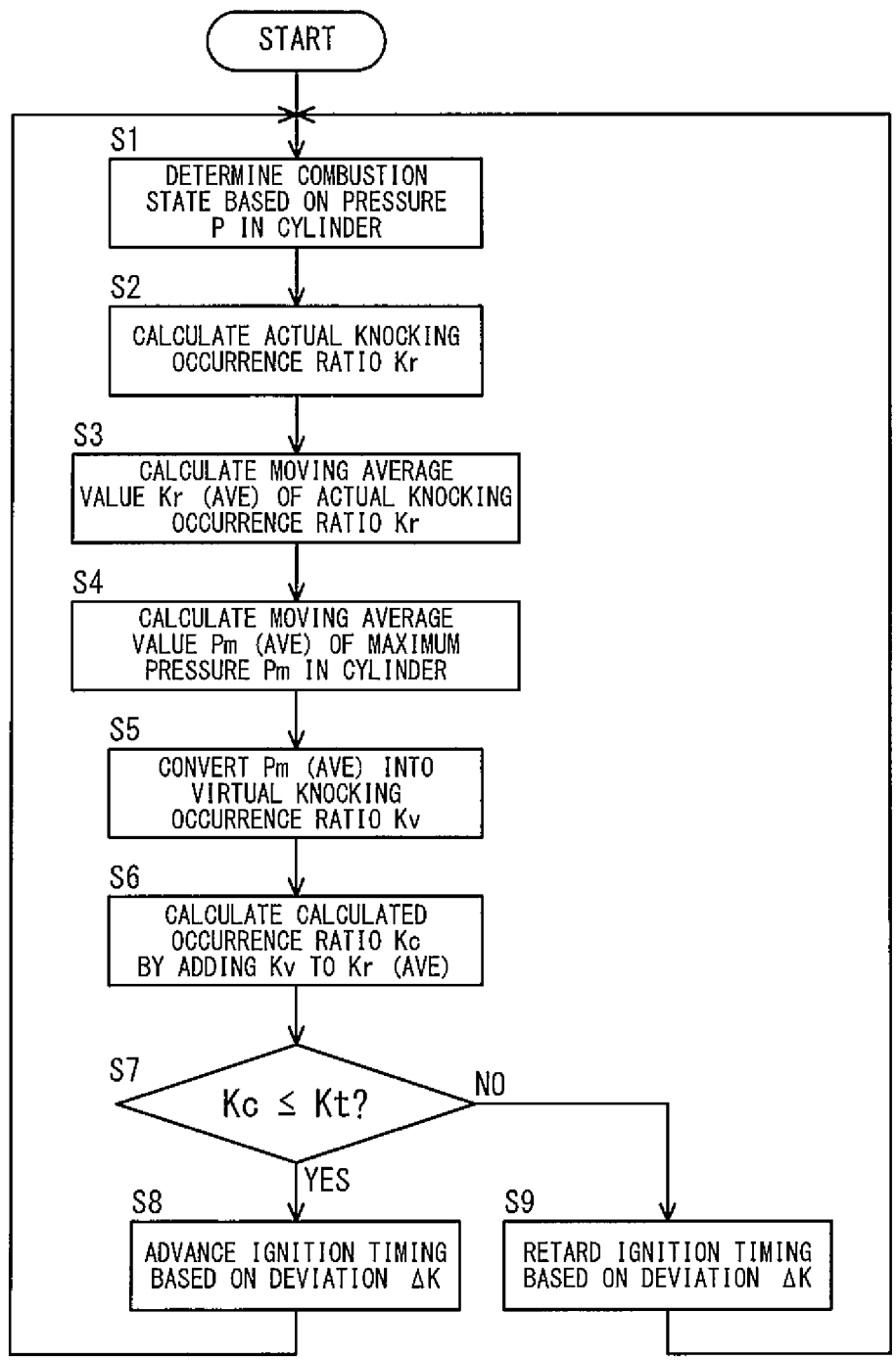
FIG. 2 is a flowchart of a method of controlling the gas engine according to one embodiment of the present invention.
Figure 3:
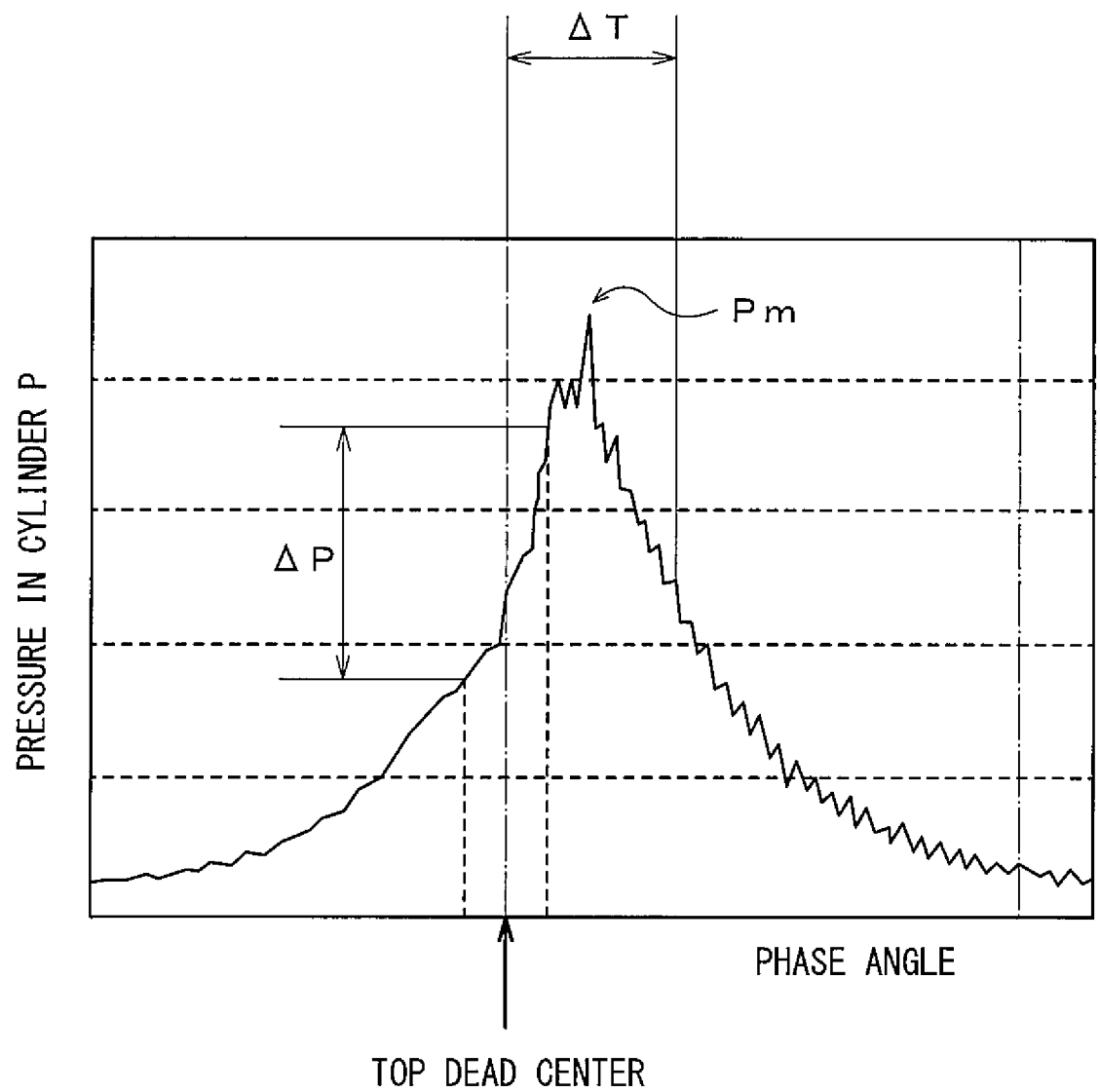
FIG. 3 shows one example of the waveform of the pressure in a cylinder.

Hereinafter, the controlling method performed by the controller 3 is described in detail with reference to a flow-chart shown in FIG. 2.

Based on the pressure P in the cylinder 21, which is detected by the pressure meter 61, the controller 3 determines, for each cycle, whether the combustion state is unallowable knocking (D), allowable knocking (C), normal (A), or misfire (B) (step S1).

The combustion state is determined, for example, by the following method. The controller 3 passes the waveform, shown in FIG. 3, of the pressure in the cylinder 21 through a filter to extract high-frequency components within a predetermined period $\Delta T$, which is a period of time from when the piston 22 reaches the top dead center. Then, the controller 3 samples a plurality of high-frequency components from among the extracted high-frequency components, and calculates an average value PA of the sampled high-frequency components. If the average value PA is greater than or equal to a first threshold $\gamma 1$ ($\gamma 1 \leq PA$), the combustion state is determined to be unallowable knocking. If the average value PA is less than the first threshold $\gamma 1$, but greater than or equal to a second threshold $\gamma 2$ ($\gamma 2 \leq PA < \gamma 1$), the combustion state is determined to be allowable knocking. The controller 3 also calculates a deviation $\Delta P$ between the pressure P in the cylinder 21 before reaching the top dead center and the pressure P in the cylinder 21 after reaching the top dead center. If the deviation $\Delta P$ is less than a third threshold $\gamma 3$ ($\Delta P < \gamma 3$), the combustion state is determined to be misfire. If the deviation $\Delta P$ is greater than or equal to the third threshold $\gamma 3$, and the average value PA is less than the second threshold $\gamma 2$ ($\gamma 3 \leq \Delta P$, $PA < \gamma 2$), the combustion state is determined to be normal.

Figure 4:
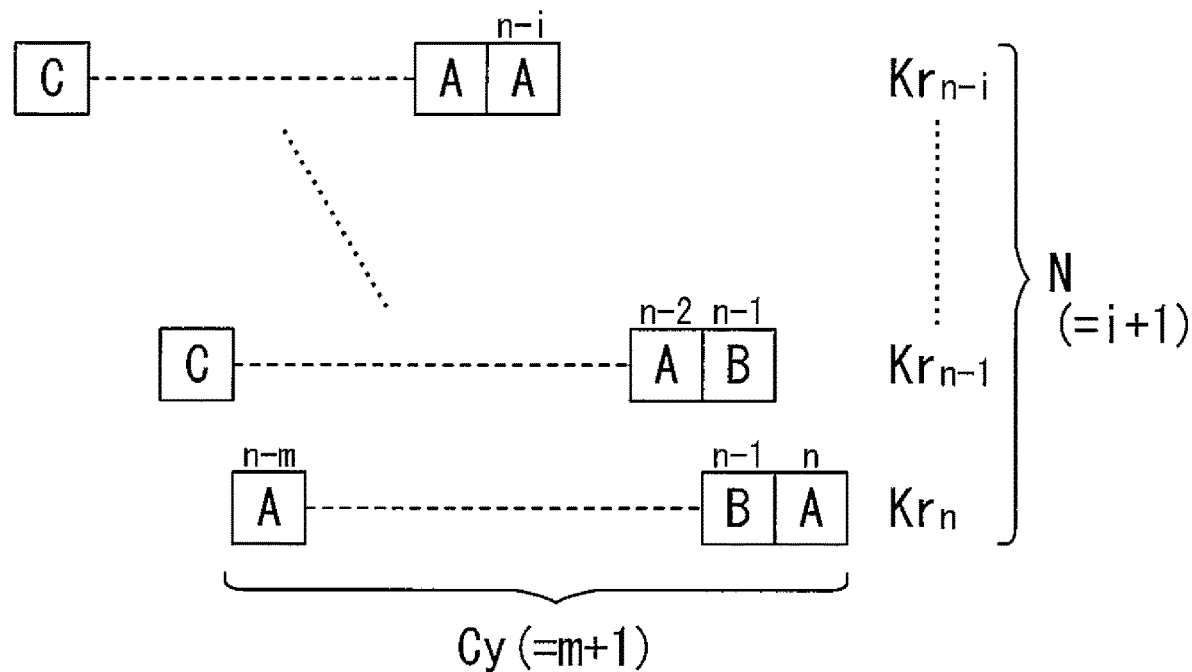
FIG. 4 is a diagram for describing an actual knocking occurrence ratio and its moving average value.

As shown in FIG. 4, assuming that the current cycle is the nth cycle, the controller 3 stores therein the combustion state of each of the past Cy cycles including the current cycle. The controller 3 obtains the number of cycles Ck, in which allowable knocking (C) has occurred, among the past Cy cycles including the current cycle, and divides Ck by Cy, thereby calculating the actual knocking occurrence ratio $Kr_n$ in the current cycle (step S2). It should be noted that, as shown in FIG. 4, the calculated actual knocking occurrence ratios Kr over predetermined N cycles including the current cycle are stored in the controller 3.

Next, the controller 3 calculates a moving average value Kr (AVE) of the actual knocking occurrence ratio Kr (step S3). To be more specific, as shown in FIG. 4, assuming that the current cycle is the nth cycle, the controller averages the actual knocking occurrence ratios Kr over the past N cycles including the current cycle (Kr (AVE)=($Kr_n$+ $Kr_{n-1}$+ ... +$Kr_{n-N+1}$)/N).

In a case where the load on the gas engine 1 is constant or varies to a small degree, for example, in a case where the gas engine 1 is used for power generation on the ground, it is desirable that N be relatively great (e.g., 50 cycles). On the other hand, in a case where the load on the gas engine 1 varies frequently, for example, in a case where the gas engine 1 is used as a main engine of a ship, it is desirable that N be relatively small (e.g., 10 cycles).

Next, as a delay calculation value of a maximum pressure Pm in the cylinder 21, the controller 3 calculates a moving average value Pm (AVE) of the maximum pressure Pm (step S4). Alternatively, the delay calculation value may be a first-order lag calculation value. The controller 3 stores therein the maximum pressures Pm of the past M cycles including the current cycle (e.g., M is five). Assuming that the current cycle is the nth cycle, the controller 3 averages the maximum pressures Pm over the past M cycles including the current cycle (Pm (AVE)=($Pm_n$+ $Pm_{n-1}$+ ... +$Pm_{n-M+1}$)/M).

Figure 5:
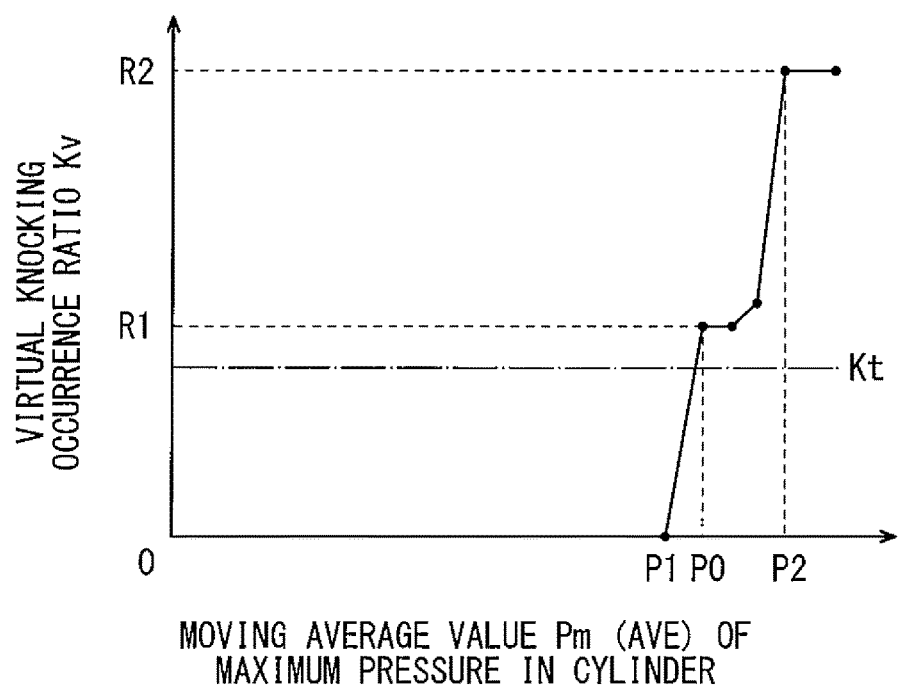
FIG. 5 is a graph for converting a moving average value of the maximum pressure in the cylinder into a virtual knocking occurrence ratio.

Thereafter, the controller 3 converts the moving average value Pm (AVE) of the maximum pressure Pm in the cylinder 21 into a virtual knocking occurrence ratio Kv (step S5). Specifically, as shown in FIG. 5, when the moving average value Pm (AVE) is greater than or equal to a reference value P0 (e.g., 20 MPa), the controller 3 converts the moving average value Pm (AVE) into a virtual knocking occurrence ratio Kv greater than or equal to a value R1 (e.g., 9.0%), which is greater than the target occurrence ratio Kt.

In the present embodiment, when the moving average value Pm (AVE) is between the reference value P0 and a lower setting value P1 less than the reference value P0, the controller 3 converts the moving average value Pm (AVE) into the virtual knocking occurrence ratio Kv by proportional calculation between zero and R1. In other words, between P1 and P0, the virtual knocking occurrence ratio Kv increases at a constant slope from zero to R1. For example, the lower setting value P1 is less than the reference value P0 by 1 to 2 Mpa (e.g., 18.5 MPa). When the moving average value Pm (AVE) is less than or equal to the lower setting value P1, the controller 3 converts the moving average value Pm (AVE) into the virtual knocking occurrence ratio Kv of zero.

Further, in the present embodiment, when the moving average value Pm (AVE) is greater than or equal to an upper setting value P2, which is greater than the reference value P0, the controller 3 converts the moving average value Pm (AVE) into the virtual knocking occurrence ratio Kv of a value R2 (e.g., 20%), which is 1.5 times or more as great as the target occurrence ratio Kt. For example, the upper setting value P2 is greater than the reference value P0 by 2 to 4 Mpa (e.g., 23 MPa).

Next, both when the moving average value Pm (AVE) of the maximum pressure Pm in the cylinder 21 is greater than or equal to the reference value P0 and when the moving average value Pm (AVE) of the maximum pressure Pm in the cylinder 21 is less than the reference value P0, the controller 3 calculates a calculated occurrence ratio Kc by adding the virtual knocking occurrence ratio Kv to the moving average value Kr (AVE) (step S6). Thereafter, the controller 3 compares the calculated occurrence ratio Kc (i.e., the moving average value Kr (AVE) to which the virtual knocking occurrence ratio Kv is added) with the target occurrence ratio Kt (step S7). In other words, the virtual knocking occurrence ratio Kv is added to the moving average value Kr (AVE), and then the resulting moving average value Kr (AVE) of the actual knocking occurrence ratio Kr is compared with the target occurrence ratio Kt.

If the calculated occurrence ratio Kc is lower than the target occurrence ratio Kt (YES in step S7), the controller 3 advances the ignition timing based on a deviation $\Delta K$ (=Kt−Kc) between the calculated occurrence ratio Kc and the target occurrence ratio Kt (step S8). On the other hand, if the calculated occurrence ratio Kc is higher than the target occurrence ratio Kt (NO in step S7), the controller 3 retards the ignition timing based on the deviation $\Delta K$ (=Kc−Kt)

between the calculated occurrence ratio Kc and the target occurrence ratio Kt (step S9). In FIG. 2, the flow proceeds to step S8 if Kc=Kt. However, as an alternative, the flow may proceed to step S9 if Kc=Kt. Thereafter, the flow returns to step S1.

As described above, in the controlling method of the present embodiment, in a case where knocking hardly occurs in the cylinder 21 and the ignition timing is too advanced, causing the maximum pressure Pm in the cylinder 21 to become excessively high, the maximum pressure Pm in the cylinder 21 is converted into the virtual knocking occurrence ratio Kv greater than or equal to the value R1, which is greater than the target occurrence ratio Kt, and the ignition timing is retarded. Therefore, even in a case where a fuel gas with a high methane number is used as a fuel gas for the gas engine 1, the gas engine 1 can be operated with suitable ignition timing.

Further, in the present embodiment, since the calculated occurrence ratio Kc is calculated both when the moving average value Pm (AVE) of the maximum pressure Pm in the cylinder 21 is greater than or equal to the reference value P0 and when the moving average value Pm (AVE) of the maximum pressure Pm in the cylinder 21 is less than the reference value P0, the virtual knocking occurrence ratio Kv can be always added to the actual knocking occurrence ratio Kr. This makes it possible to simplify the control logic.

Still further, in the present embodiment, when the moving average value Pm (AVE) of the maximum pressure Pm in the cylinder 21 is greater than or equal to the upper setting value P2, the moving average value Pm (AVE) is converted into the virtual knocking occurrence ratio Kv of the value R2, which is 1.5 times or more as great as the target occurrence ratio Kt. Accordingly, when the maximum pressure Pm in the cylinder 21 becomes close to the upper setting value P2 (e.g., mechanical upper limit), the ignition timing is greatly retarded. Therefore, even if an unfavorable condition occurs, the condition can be improved immediately.

Variations

The present invention is not limited to the above-described embodiment. Various modifications can be made without departing from the spirit of the present invention.

For example, in the above-described embodiment, as shown in FIG. 5, between the lower setting value P1 and the reference value P0, the virtual knocking occurrence ratio Kv increases at a constant slope from zero to R1. However, as an alternative, the virtual knocking occurrence ratio Kv may increase from zero to R1 perpendicularly when the moving average value Pm (AVE) of the maximum pressure Pm in the cylinder 21 becomes the reference value P0. However, if the virtual knocking occurrence ratio Kv increases gradually from zero as in the above-described embodiment, the stability can be improved compared to a case where the virtual knocking occurrence ratio K0 increases rapidly from zero.

In the above-described embodiment, when the moving average value Pm (AVE) of the maximum pressure Pm in the cylinder 21 is less than or equal to the lower setting value P1, the moving average value Pm (AVE) is converted into the virtual knocking occurrence ratio Kv of zero. However, as an alternative, step S10 of comparing the moving average value Pm (AVE) with the lower setting value P1 may be performed before step S5 as shown in FIG. 6, and the moving average value Pm (AVE) may be converted into the virtual knocking occurrence ratio Kv only when the moving average value Pm (AVE) is greater than or equal to the lower setting value P1.

In this case, when the moving average value Pm (AVE) is less than the lower setting value P1 (NO in step S10), the moving average value Kr (AVE) of the actual knocking occurrence ratio Kr may be directly compared with the target occurrence ratio Kt (step S11).

Alternatively, when the moving average value Pm (AVE) is greater than or equal to the lower setting value P1, it can be assumed that the moving average value Kr (AVE) of the actual knocking occurrence ratio Kr is substantially zero. Therefore, instead of steps S6 and S7 of FIG. 6, step S12 of comparing the virtual knocking occurrence ratio Kv with the target occurrence ratio Kt may be adopted as shown in FIG. 7. In other words, instead of the moving average value Kr (AVE) of the actual knocking occurrence ratio Kr, the virtual knocking occurrence ratio Kv may be compared with the target occurrence ratio Kt. Then, if the virtual knocking occurrence ratio Kv is lower than the target occurrence ratio Kt, the ignition timing is advanced based on the deviation $\Delta K$ (=Kt−Kv) between the virtual knocking occurrence ratio Kv and the target occurrence ratio Kt, and if the virtual knocking occurrence ratio Kv is higher than the target occurrence ratio Kt, the ignition timing is retarded based on the deviation $\Delta K$ (=Kv−Kt) between the virtual knocking occurrence ratio Kv and the target occurrence ratio Kt.

Figure 6:
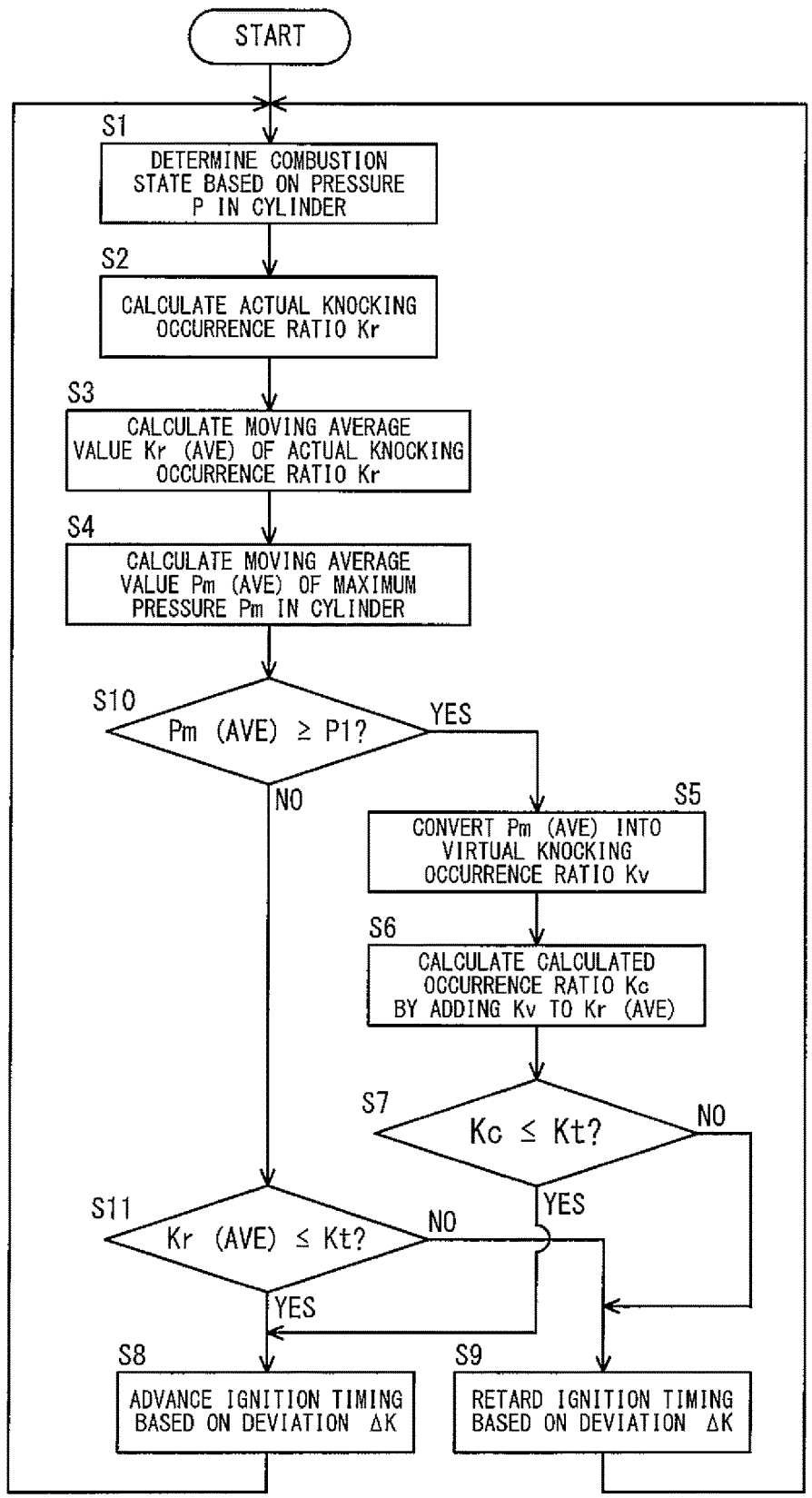
FIG. 6 is a flowchart of the method of controlling the gas engine according to one variation.
Figure 7:
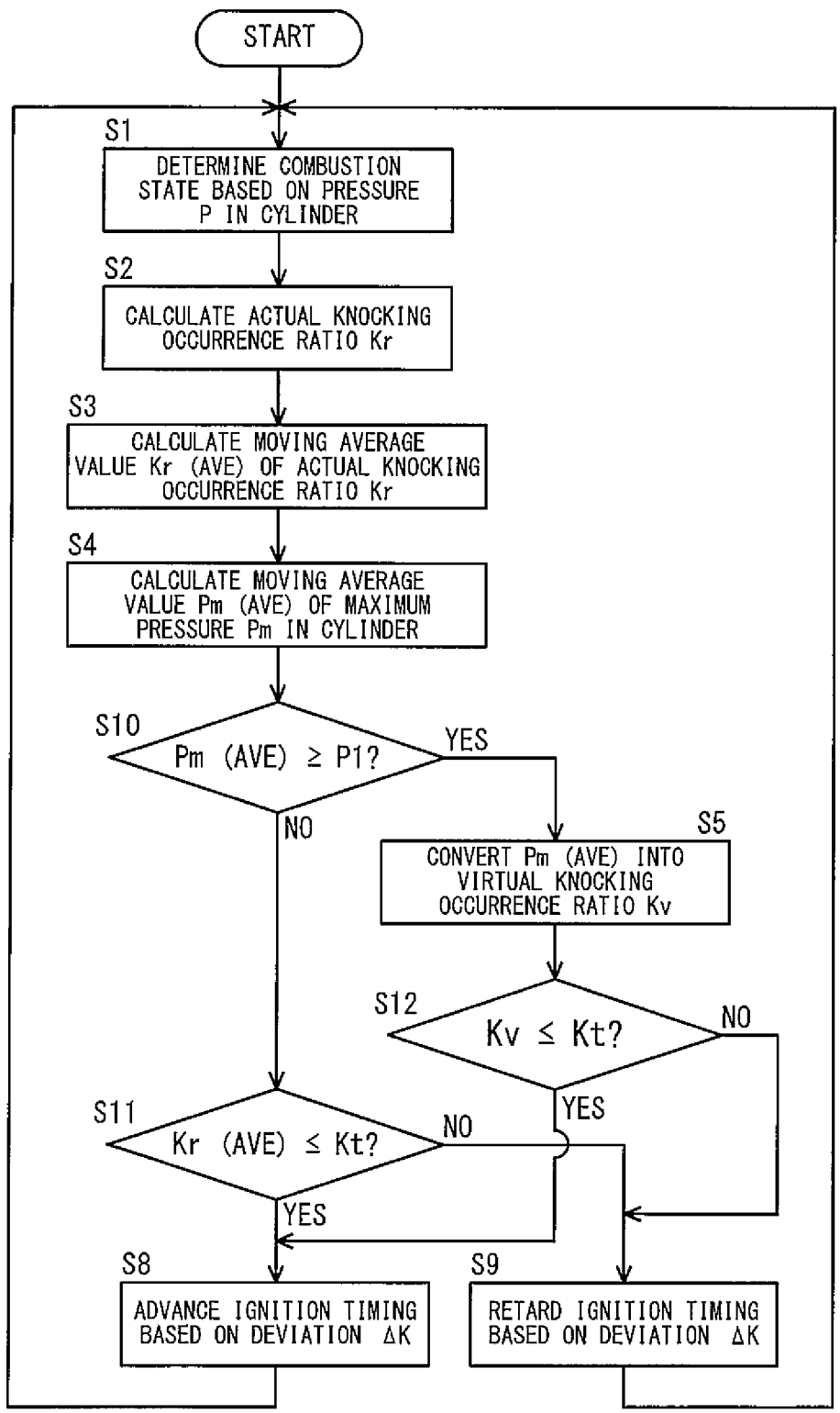
FIG. 7 is a flowchart of the method of controlling the gas engine according to another variation.

It should be noted that in a case where the virtual knocking occurrence ratio Kv is increased from zero to R1 perpendicularly when the moving average value Pm (AVE) of the maximum pressure Pm in the cylinder 21 becomes the reference value P0, the moving average value Pm (AVE) may be compared not with the lower setting value P1 but with the reference value P0 in step S10 shown in FIG. 6 and FIG. 7.

REFERENCE SIGNS LIST 1 gas engine
21 cylinder
Pm maximum pressure
Pr (AVE) moving average value
Kr actual knocking occurrence ratio
Kr (AVE) moving average value (delay calculation value)
Kv virtual knocking occurrence ratio
Kc calculated occurrence ratio
$\Delta K$ deviation

The invention claimed is:

1. A method of controlling a gas engine that is operated under lean-burn conditions, the method adjusting ignition timing such that a delay calculation value of an actual knocking occurrence ratio becomes a target occurrence ratio, the method comprising:
 when a delay calculation value of a maximum pressure in a cylinder of the gas engine is greater than or equal to a reference value, converting the delay calculation value of the maximum pressure in the cylinder into a virtual knocking occurrence ratio greater than or equal to a value that is greater than the target occurrence ratio; and either
 adding the virtual knocking occurrence ratio to the delay calculation value of the actual knocking occurrence ratio and then comparing the resulting delay calculation value of the actual knocking occurrence ratio with the target occurrence ratio, or
 comparing the virtual knocking occurrence ratio instead of the delay calculation value of the actual knocking occurrence ratio with the target occurrence ratio.

2. The method of controlling a gas engine according to claim 1, comprising:

when the delay calculation value of the maximum pressure in the cylinder is between the reference value and a lower setting value less than the reference value, converting the delay calculation value of the maximum pressure in the cylinder into the virtual knocking occurrence ratio by proportional calculation between zero and the value greater than the target occurrence ratio; and either adding the virtual knocking occurrence ratio to the delay calculation value of the actual knocking occurrence ratio and then comparing the resulting delay calculation value of the actual knocking occurrence ratio with the target occurrence ratio, or comparing the virtual knocking occurrence ratio instead of the delay calculation value of the actual knocking occurrence ratio with the target occurrence ratio.

3. The method of controlling a gas engine according to claim 2, comprising:

both when the delay calculation value of the maximum pressure in the cylinder is greater than or equal to the reference value and when the delay calculation value of the maximum pressure in the cylinder is less than the reference value, adding the virtual knocking occurrence ratio to the delay calculation value of the actual knocking occurrence ratio and then comparing the resulting delay calculation value of the actual knocking occurrence ratio with the target occurrence ratio, and when the delay calculation value of the maximum pressure in the cylinder is less than or equal to the lower setting value, converting the delay calculation value of the maximum pressure in the cylinder into the virtual knocking occurrence ratio of zero.

4. The method of controlling a gas engine according to claim 1, comprising, when the delay calculation value of the maximum pressure in the cylinder is greater than or equal to an upper setting value that is greater than the reference value, converting the delay calculation value of the maximum pressure in the cylinder into the virtual knocking occurrence ratio of a value that is 1.5 times or more as great as the target occurrence ratio.

5. The method of controlling a gas engine according to claim 1, wherein
the delay calculation value of the maximum pressure in the cylinder is a moving average value of the maximum pressure.

6. The method of controlling a gas engine according to claim 2, comprising, when the delay calculation value of the maximum pressure in the cylinder is greater than or equal to an upper setting value that is greater than the reference value, converting the delay calculation value of the maximum pressure in the cylinder into the virtual knocking occurrence ratio of a value that is 1.5 times or more as great as the target occurrence ratio.

7. The method of controlling a gas engine according to claim 3, comprising, when the delay calculation value of the maximum pressure in the cylinder is greater than or equal to an upper setting value that is greater than the reference value, converting the delay calculation value of the maximum pressure in the cylinder into the virtual knocking occurrence ratio of a value that is 1.5 times or more as great as the target occurrence ratio.

8. The method of controlling a gas engine according to claim 2, wherein
the delay calculation value of the maximum pressure in the cylinder is a moving average value of the maximum pressure.

9. The method of controlling a gas engine according to claim 3, wherein
the delay calculation value of the maximum pressure in the cylinder is a moving average value of the maximum pressure.

10. The method of controlling a gas engine according to claim 4, wherein
the delay calculation value of the maximum pressure in the cylinder is a moving average value of the maximum pressure.

11. The method of controlling a gas engine according to claim 6, wherein
the delay calculation value of the maximum pressure in the cylinder is a moving average value of the maximum pressure.

12. The method of controlling a gas engine according to claim 7, wherein
the delay calculation value of the maximum pressure in the cylinder is a moving average value of the maximum pressure.

* * * * *